United States Patent Office 3,813,389
Patented May 28, 1974

3,813,389
PROCESS FOR 7-AMINOCEPHALOSPORANIC
ACID
Harold B. Hayes, Indianapolis, Ind., assignor to
Eli Lilly and Company, Indianapolis, Ind.
No Drawing. Filed Sept. 3, 1971, Ser. No. 177,869
Int. Cl. C07d 99/24
U.S. Cl. 260—243 C                                   6 Claims

ABSTRACT OF THE DISCLOSURE

Improved process for preparing 7-aminocephalosporanic acid comprising reacting penicillin contaminated cephalosporin C, protected cephalosporin C and salts thereof with a carboxylic acid halide in the presence of an imide such as DMAC or DMF to obtain the mixed anhydride blocked derivative and thereafter cleaving the α-aminoadipoyl side chain therefrom by known process via imino halide and imino ether formation followed by aqueous hydrolysis to provide 7-ACA substantially free of penicillin contaminants.

BACKGROUND OF THE INVENTION

The cephalosporin class of antibiotics has achieved a position of importance as therapeutic agents for combatting infections in man. Cephalosporin C, the first such antibiotic to be isolated, while only moderately active, has served as the precursor for more efficacious cephalosporin antibiotics.

Cephalosporin C is produced during the fermentation of Cephalosporium species as described in British Patent Specification 810,196, published Mar. 11, 1959. Penicillin type compounds, and in particular cephalosporin N (Synnematin B) are produced along with cephalosporin C.

Cephalosporin C is converted to more active cephalosporins by first cleaving the α-amino adipoyl side chain from the cephalosporin C molecule to produce 7-aminocephalosporanic acid (7-ACA) and thereafter acylating 7-ACA according to well-known methods to obtain the desired cephalosporin antibiotic.

Among the methods used for cleaving the α-aminoadipoyl side chain from cephalosporin C is that described by Canadian Pat. 770,125, British Patent Specification 1,041,985 and J. Chem. Soc., 83, 320 (1963). According to this leavage method and various improvements thereon as described in U.S. Pat. 3,499,909 and co-pending application, Ser. No. 117,043, filed Feb. 19, 1971, the carboxylic acid and amino group of cephalosporin C are protected and the protected compound is reacted with a halogenating agent such as phosphorus pentachloride to form the imino-halide. The imino-halide is reacted with an alcohol to provide the corresponding imino ether which on hydrolysis yields 7-aminocehalosporanic acid or an ester thereof. In the case where the carboxylic acid groups of celphalosporin C are protected with a readily hydrolyzable ester moiety, the free acid, 7-ACA is obtained. Otherwise, an additional ester removing reaction step is required to produce 7-ACA.

A particularly useful method for preparing 7-ACA by the cleavage of the α-aminoadipoyl side chain from cephalosporin C is that described by co-pending application Ser. No. 117,043. According to this method, the carboxylic acid groups of cephalosporin C are protected by the formation of mixed anhydrides prepared by reacting the antibiotic with a carboxylic acid chloride in the presence of a tertiary amine. The mixed anhydride protected cephalosporin C thus obtained, for example, the mixed anhydride formed with acetyl chloride, is particularly valuable in the cleavage reaction in that the mixed anhydride undergoes hydolysis during the hydrolysis of the imino ether intermediate to afford 7-amino-cephalosporanic acid directly from the cleavage reaction mixture. This improved cleavage method thus avoids the use of carboxylic acid protecting ester moieties which are not readily hydrolyzed and which therefore require an additional reaction step to achieve their removal.

The above-described side chain cleavage method is carried out under mild conditions. Consequently any penicillin type compounds, for example cephalosporin N, which are co-produced in the fermentation along with cephalosporin C can survive the conditions of the side chain cleavage reaction thereby resulting in penicillin contamination of the 7-aminocephalosporanic acid product. For example, any cephalosporin N present in the cephalosporin C starting material will likewise undergo cleavage to afford 6-aminopenicillanic acid (6-APA). The subsequent acylation of 7-ACA thus contaminated with 6-APA can result in the preparation of the desired 7-acylaminocephalosporanic acid contaminated with the corresponding 6-acylaminopenicillanic acid unless special precautions are taken to destroy the penicillin activity.

The presence of penicillin contaminants in cephalosporin antibiotics is undesirable, since such contamination may produce allergic reactions in those individuals demonstrating sensitivity to penicililn antibiotics. Further, such contamination detracts from the pharmaceutical elegance of the highly efficacious cephalosporin antibiotics.

Whereas methods for the destruction of penicillin-like compounds in the presence of cephalosporin antibiotics are known, for example, the method described by U.S. Pat. 3,497,504, a method for the destruction of penicillin contaminants in the process for preparing 7-ACA by the side-chain cleavage of cephalosporin C would be desirable.

SUMMARY OF THE INVENTION

This invention relates to an improved process for the production of 7-aminocephalosporanic acid. In particular it relates to an improvement in the process for cleaving the α-aminoadipoyl side chain from cephalosporin C comprising the in situ destruction of penicillin type compounds, thereby providing 7-aminocephalosporanic acid substantially free of penicillin contaminants.

In the process for cleaving cephalosporin C described by co-pending application Ser. No. 117,043 which comprises blocking the carboxylic acid and amino groups of the antibiotic, reacting the blocked antibiotic wth a halogenating agent to convert the amido group to an imino halide, reacting the imino halide with an alcohol to obtain an imino ether, then hydrolyzing the imino ether to provide 7-ACA, the carboxylic acid functions of cephalosporin C are converted to mixed anhydrides by reacting cephalosporin C or an amino protected derivative thereof with a carboxylic acid chloride in the presence of a tertiary amine. The present invention comprises reacting cephalosporin C or a suitable derivative thereof with a carboxylic acid halide in the presence of an amide such as dimethylacetamide or dimethylformamide. The improvement of this invention, comprising the replacement of a tertiary amine such as diethylaniline with an amide such as dimethylacetamide in the process step for preparing the mixed anhydrides of cephalosporin C, achieves the destruction of antibiotic activity attributable to penicillins.

DETAILED DESCRIPTION

According to the improved method of this invention, 7-aminocephalosporanic acid is produced substantially free of contaminating penicillins and in particular 6-aminopenicillanic acid when, in the process for cleaving the α-aminoadipoyl side chain of cephalosporin C which is contaminated with penicillin type compounds, the carboxylic acid group of cephalosporin C are blocked by the formation of a mixed anhydride by reacting the antibiotic with a carboxylic acid halide in the presence of an amide such as dimethylacetamide or dimethylformamide.

According to the practice of this invention, cephalosporin C or a suitable derivative thereof represented by the formula I

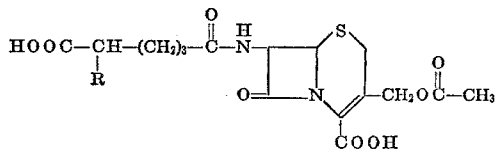

wherein R is amino or protected amino, and the cationic or amine salts thereof, is reacted in an inert solvent under essentially anhydrous conditions in the presence of an amide selected from the group consisting of dimethylformamide, dimethylacetamide, pyrrolidone, N-methylpyrrolidone, piperidone and N-methylpiperidone with a carboxylic acid halide represented by the formula

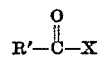

wherein X is chloro or bromo; and R' is $C_1$-$C_8$ alkyl, $C_2$-$C_6$ alkenyl, $C_2$-$C_6$ alkynyl; $C_1$-$C_8$ haloalkyl, $C_2$-$C_6$ haloalkenyl, $C_2$-$C_6$ haloalkynyl, phenyl, halophenyl, lower alkyl substituted phenyl, or lower alkoxy substituted phenyl; to form a mixed anhydride with cephalosporin C represented by the formula II

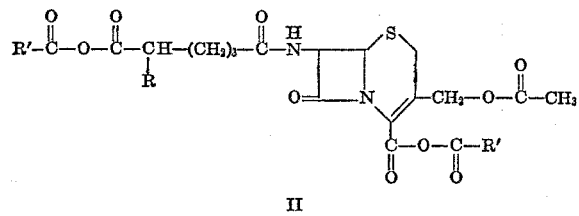

II wherein R and R' are as defined above. The mixed anhydride derivative of cephalosporin C thus prepared is then subjected to the known cleavage conditions as previously described to yield 7-ACA free of penicillin contaminants.

In the above formula I, R can be a free amino group, in which case cephalosporin C is represented, or R can be a protected amino group. The term "protected amino" group refers to a substituted amino group substituted by any of a wide variety of amino-protecting groups commonly employed as such; for example, R can be acetamido, propionamido, butyramido, chloroacetamido, benzamido, phthalimido, t-butyloxycarbamido and like protected amino groups. The type of amino protecting group is generally unimportant and not critical in the improved process described herein because of its subsequent removal along with the side chain during the cleavage reaction.

The term "lower alkyl" as used herein refers to the straight and branched chain $C_1$ to $C_4$ hydrocarbon groups such as methyl, ethyl, n-propyl, isopropyl, n-butyl, sec-butyl, and the like. The term "lower alkoxy" refers to the $C_1$-$C_4$ alkyl ether groups such as methoxy, ethoxy, n-propoxy, iso-propoxy, n-butoxy, t-butoxy and the like.

The particular form of cephalosporin C employed as the starting material likewise is not critical in the improved method of this invention and cephalosporin C as the free acid or any suitable salt of the antibiotic can be used. For example the alkali and alkaline earth metal salts such as the cationic salts of sodium, potassium, lithium, calcium and magnesium as well as the zinc salt can be used. In general, any salt form of cephalosporin C which is formed for the purpose of recovering and isolating the antibiotic from fermentation broths can be used in the present process.

Amine salts of cephalosporin C or an imino-protected cephalosporin C which can be employed are, for example, those formed with such amines as quinoline, α-picoline, β-picoline, γ-picoline, 2,6-lutidine, 2,4-lutidine, dimethylamine, diethylamine, di-n-propylamine, di-n-butyl amine, benzylamine, dicyclohexylamine, dibenzylamine, and like amine salts.

The mixed anhydride of cephalosporin C can be prepared with a variety of carboxylic acid halides and preferably the chlorides. Examples of carboxylic acids, the halides of which can be used in the present process are, acetic, propionic, butyric, valeric, caprylic, pelargonic, vinylacetic, acrylic, crotonic, pent-3-ene-1-oic, hex - 4-ene - 1 - oic, hept-4-ene-1-oic, propiolic, pent-3-yn-1-oic, hept-5-yn-1-oic, chloroacetic, bromoacetic, 4-bromobutyric, 3 - chlorohexanoic, 4-bromooctanoic, 4-chloro-2-pentenoic, 4-chlorooct-6-ene-1-oic, 4-bromobut-2-yn-1-oic, 7-chloro-hep-3-yn-1-oic, benzoic, p-toluic, m-toluic, 4-isopropylbenzoic, 4-n-butylbenzoic, 4-chlorobenzoic, 3,4-dichlorobenzoic, 3-bromobenzoic, 4-methoxybenzoic, 4-ethoxybenzoic, 4-t-butoxybenzoic, 3-methoxy-4-ethoxybenzoic and like acids.

The particular carboxylic acid halide employed to prepare the mixed anhydride protected cephalosporin C is not critical, and any carboxylic acid which provides a readily hydrolyzable mixed anhydride with cephalosporin C can be used in the present process.

As previously mention, the preparation of the mixed anhydride of cephalosporin C according to this invention is carried out in the presence of an amide such as di-methylformamide or dimethylacetamide rather than in the presence of a tertiary amine such as triethylamine or diethylaniline. Secondary and tertiary amides which have good solvent properties can be used, for example, dimethylformamide, dimethylacetamide, pyrrolidone-2, N-methylpyrrolidone-2, piperidone-2, N-methylpiperidone-2 and like amides.

The preparation of the mixed anhydrides of cephalosporin C is carried out in an inert solvent under substantially anhydrous conditions in the presence of one of the above described amides. Inert solvents are those in which the starting materials and reagents are at least partially soluble and which are unreactive in the anhydride formation reaction also in the subsequent imino halide and imino ether formation reactions as well as in the final hydrolysis reaction. Solvents which can be employed include, but are not limited to, for example, lower alkyl nitriles such as acetonitrile, butyronitrile, propionitrile and the like; halogenated alkyl hydrocarbons such as chloroform, methylene chloride, 1,1 - dichloroethane, 1,2 - dichloroethane, 1,1,2-trichloroethane, 1,2,3-trichloropropane and the like; esters which are stable under the conditions of the cleavage reaction such as ethyl chloroacetate, diethyl oxalate and methyl 3-chloropropionate. Many other suitable solvents will be known to those skilled in the art. The precise nature nature of the solvent is not critical so long as it meets the foregoing criteria for inertness.

The mixed anhydride blocking reaction can be carried out at a temperature between about 5 and 55° C. and preferably at about 20 to 30° C. The reaction proceeds rapidly and is generally considered complete within about one hour after the addition of the carboxylic acid halide.

The preparation of the mixed anhydride protected cephalosporin C is carried out according to the present process as follows: Cephalosporin C, or a derivative or salt thereof, is dissolved or suspended in the reaction solvent in a ratio of antibiotic to solvent of between about 2.0 and 10 ml. of solvent per millimole of antibiotic and preferably between about 2.5 ml. and 7.5 ml. of solvent per millimole of antibiotic. An amide selected from the group described above is then added to the stirred solution or suspension in an amount from about 5 mmoles to about 20 mmoles per millimole of antibiotic. The foregoing ratios of solvent and amide to antibiotic are not critical in the improved process provided herein but represent convenient ratios taking into account the entire side chain cleavage reaction sequence comprising the subsequent imino halide, imino ether and hydrolysis steps. For example, higher or lower ratios of solvent to antibiotic and amide to antibiotic can be employed and may be desirable depending upon the particular form of cephalosporin C employed as the starting material. The antibiotic-solvent-amide mixture is maintained at a temperature between about 5 and 55° C., preferably between about 20 and 30° C. while the carboxylic acid halide is added. The amount of acid halide added can vary. For example, when the amino group of cephalosporin C is unprotected, then in addition to the amount of acid halide required to form the mixed anhydride, a sufficient amount is added to provide for the acylation of the free amino group. Likewise, when a derivative or salt of cephalosporin C is employed which contains water of hydration, then an additional amount of acid halide is added to compensate for the amount consumed on reaction with water of hydration. In the absence of such requirements, the acid halide is added in excess in an amount of between about 4.5 mmoles and 8 mmoles per mmole of cephalosporin C or a salt or a derivative thereof.

The reaction mixture is stirred for about 5 minutes to about one hour. In general, the more dilute reaction mixtures are stirred at the reaction temperature for about 45 minutes, while the more concentrated mixtures require only about 5 to 10 minutes to complete the formation of the mixed anhydride.

Following the above reaction period, the aminoadipoyl or protected aminoadipoyl side chain of the mixed anhydride protected cephalosporin C is cleaved according to the known method as follows.

The reaction mixture containing the mixed anhydride protected cephalosporin C obtained as described above is cooled to a temperature of about −20 to −10° C. and a tertiary amine such as quinoline or diethylaniline is added. Thereafter, a solution of a halogenating agent such as phosphorus pentachloride or phosphorus oxychloride in an inert solvent, for example acetonitrile or chloroform, is added to the cold reaction mixture. The reaction mixture is stirred for about one hour at −20 to −10° C. to provide the imino chloride intermediate. The imino chloride intermediate is converted *in situ* to an imino ether by adding to the cold reaction mixture a lower alkanol such as methanol, ethanol or benzyl alcohol. The reaction mixture containing the added alcohol is generally stirred for about one hour at a temperature between about −20 and −10° C. to effect the formation of the imino ether.

Hydrolysis of the imino ether is thereafter accomplished by the addition of water to the reaction mixture to provide 7-ACA.

Accordingly, water is added to the reaction mixture containing the imino ether and the mixture is stirred for about 5 to 15 minutes. The aqueous phase is separated and the pH thereof is adjusted to about pH 3.5 by the addition of a suitable base, preferably concentrated ammonium hydroxide. Following the adjustment in pH, the aqueous mixture is stirred for about 30 minutes during which time 7-aminocephalosporanic acid forms as a crystalline precipitate.

The prefered conditions and reagents of the present improved process are as follows:

The preferred amides of the previously described group are dimethylacetamide and dimethylformamide and the preferred solvents are acetonitrile and methylene chloride. Dimethylformamide is desirably employed in the more concentrated reaction mixtures, for example, when the ratio of solvent to cephalosporin C is about 2.5 ml. per millimole. Dimethylacetamide is equally effective when employed at any dilution of the reaction mixture.

As previously mentioned, the particular derivative or salt form of cephalosporin C which is employed as the starting material is not critical. For example, the protecting group for the amino group in the side chain of cephalosporin C is unimportant since the side-chain is cleaved in the process. Any suitable amino protecting group can be employed for example, any of those commonly employed in protecting the amino group of cephalosporin C such as, acetyl, propionyl, chloroacetyl, phthaloyl, t-butyloxycarbonyl and the like. Cephalosporin C itself can be employed since the amino group will be reactive with the particular acid halide employed for the formation of the mixed anhydride block.

Likewise the particular carboxylic acid halide used in the formation of the mixed anhydride can be any suitable carboxylic acid halide. In the improved process of this invention the preferred halide is the chloride and the preferred carboxylic acid chloride is acetyl chloride.

Illustrative of the forms and derivatives of cephalosporin C which can be employed in the present process are cephalosporin C, cephalosporin C quinoline salt, cephalosporin C triethylamine salt, N-chloroacetylcephalosporin C, N-acetylcephalosporin C, N-propionylcephalosporin C, N-propionylcephalosporin C quinoline salt, cephalosporin C disodium salt, N-t-butyloxycarbonylcephalosporin C dipotassium salt, cephalosporin C zinc salt, and like cephalosporin C salts and N-protected derivatives thereof.

The 7-aminocephalosporanic acid provided by the improved process of this invention is substantially free of penicillin contaminants and therefore on acylation provides the desired 7-acylaminocephalosporanic acid antibiotic substantially free of contaminating acylaminopenicillanic acids.

As discussed above, the improvement in the known side-chain cleavage process described herein resides in the substitution of one of the above described amides for a tertiary amine in the mixed anhydride formation step. The unexpected result of the substitution, in eliminating penicillin contaminants in the 7-ACA cleavage product, is illustrated in the following tables.

The penicillin assay results shown in the column on the far right in the tables are determined in the following manner.

The cleavage reaction product, 7-ACA, obtained by employing the indicated reactants and solvents is acylated with thiophene-2-acetyl chloride according to known procedures to produce 7-(2'-thienylacetamido)cephalosporanic acid and 6-(2'-thienylacetamido)penicillanic acid resulting from any 6-aminopenicillanic acid contaminant in the 7-ACA cleavage product.

The acylation product is dissolved in water and the pH of the solution is adjusted to about pH 2. The acylated cephalosporin product and any acylated penicillin present forms a precipitate which is extracted with diisopropyl ether. The extract is concentrated to about one-fourth of the original extract volume and the concentrate is chromatographed on paper using diethyl ether saturated with water for development. Bioautographs are then run with the developed chromatogram using a penicillin sensitive organism. The organism, *B. subtilis* was used to obtain the results indicated herein because of its known sensitivity to penicillins. The zones of inhibition of bacterial growth attributable to the acylated penicillanic acid are located by reference to control bioautographs. Zone sizes on the bioautographs were compared to those obtained from samples of 7-(2-thienylacetamido)cephalosporanic acid containing known amounts of 6-(2-thienylacetamido)penicillanic acid.

The above described assay method reliably detects penicillin activity at a lower level of between about 0.4 and 0.5 p.p.m.

In Table I which follows the results of substituting dimethylacetamide for a tertiary amine in the mixed anhydride formation step of the cleavage reaction are shown. In each case 20 mmoles of cephalosporin C, an aminoprotected cephalosporin C or a salt of cephalosporin C were employed.

In each instance acetyl chloride was the mixed anhydride forming reagent and approximately 50 ml. of the indicated solvent was employed.

TABLE I
Cephalosphorin C-acetic acid mixed anhydride formed with DMAC

| Starting material | Solvent | DMAC volume, ml. | Pen. assay |
|---|---|---|---|
| A[1] | CHCl$_3$ | 11 | N.D.Z.[2] |
| B[3] | CHCl$_3$ | 8.8 (94 mmoles) | N.D.Z. |
| B | CHCl$_3$ | 8.8 | N.D.Z. |
| A | CH$_2$Cl$_2$ | 8.8 | N.D.Z. |
| A | CHCl$_3$ | 13.2 | N.D.Z. |
| A | CHCl$_3$ | 8 | N.D.Z. |
| A | CH$_3$CH$_2$CN | 8.8 (94 mmoles) | N.D.Z. |
| A | CHCl$_3$ | 8.8 | N.D.Z. |
| C[4] | CHCl$_3$ | 10.4 (111 mmoles) | N.D.Z. |
| A | CH$_3$CH$_2$CN[5] | 17.6 (188 mmoles) | N.D.Z. |
| A | CHCl$_3$ | 8.7 | N.D.Z. |
| A | nC$_3$H$_7$CN | 8.8 | N.D.Z. |

[1] A = N-propionyl cephalosporin C quinoline salt.
[2] No detectable zone of inhibition.
[3] B = N-chloroacetyl cephalosporin C quinoline salt·H$_2$O.
[4] C = Cephalosporin C zinc salt.
[5] Solvent volume, 152 ml.

In Table II which follows, the results obtained when dimethylformamide (DMF) was substituted for the tertiary amine in the mixed anhydride formation step are shown. Chloroform was used as the solvent in each case.

TABLE II
Cephalosporin C-acetic acid mixed anhydride formed in D.M.F.

| Starting material | Solvent volume (ml.) | D.M.F. volume, ml. | Pen. assay |
|---|---|---|---|
| A[1] | 52 | 14.6 | N.D.Z.[2] |
| A | 52 | 7.3 (94 mmoles) | N.D.Z. |
| A | 152 | 7.3 | Low yield.[3] |

[1] N-chloroacetyl cephalosporin C quinoline salt monohydrate.
[2] No detectable zone of inhibition.
[3] Low yield of 7-ACA obtained.

In Table III, below, the results shown were obtained by the addition of an adduct formed with either DMAC or DMF and acetyl chloride. N-chloroacetyl cephalosporin C quinoline salt monohydrate was employed as the starting material and was dissolved in chloroform and the preformed amide-acetyl chloride adduct was added to the solution.

TABLE III
Mixed anhydride formation with DMAC-acetyl chloride and DMF-acetyl chloride adducts

| Adduct | Volume (ml.) | Pen. assay |
|---|---|---|
| DMAC | 8.8 | N.D.Z. |
| Acetyl chloride | 9.2 | |
| DMF | 7.3 | |
| Acetyl chloride | 9.2 | N.D.Z. |

The results shown in Table III demonstrate the effectiveness of an alternate mode of addition of the amide and carboxylic acid halide in the mixed anhydride preparation step.

The effect of carrying out the preparation of the mixed anhydride block by partially substituting an amide for a tertiary amine is illustrated by the results shown in Table IV. In both cases the starting material was N-chloroacetyl cephalosporin C quinoline salt monohydrate and approximately 50 ml. of the indicated solvent were used. As shown on the first line, a large zone of inhibition of bacterial growth was observed when only diethylaniline was employed. In contrast, as shown on lines 6 and 8 in Table I, when DMAC was used instead of diethylaniline no detectable zone of inhibition was observed. On the second line, DMAC and diethylaniline were used together in the mixed anhydride formation step. In contrast to the results obtained with complete substitution of an amide for a tertiary amine as shown on line 10 of Table I a zone of bacterial growth of significant size was obtained.

TABLE IV
Cephalosporin C-acetic acid mixed anhydride formed in diethylaniline

| Solvent | DMAC vol., ml. | DEA[1] vol., ml. | Pen. assay |
|---|---|---|---|
| CHCl$_3$ | None | 15.1 (94 mM.) | Large zone. |
| C$_2$H$_5$CN | 17.6 (188 mM.) | 15.1 (94 mM.) | 50-100 p.p.m. |

[1] Diethylaniline.

The foregoing assay results show the effectiveness of the improved process of this invention in eliminating any penicillin antibiotic contamination in 7-aminocephalosporanic acid prepared by the cleavage reaction.

The improved process of this invention provides 7-ACA in yields equal to or superior to those obtained by the known method.

The following examples further illustrate the improved process of the present invention.

EXAMPLE 1

To a solution of 15.3 g. of N-chloroacetyl cephalosporin C quinoline salt monohydrate in 52 ml. of chloroform was added 8.8 ml. of dimethylacetamide. To the stirred solution was added 10.1 ml. of acetyl chloride at room temperature and, after addition was complete, the reaction mixture was stirred for about 5 minutes. The reaction mixture was then cooled to about −15° C. and 26 ml. of diethylaniline were added followed by a solution of 9.8 g. of phosphorus pentachloride in 100 ml. of chloroform. The reaction mixture was then stirred for about 30 minutes and, thereafter, 50 ml. of cold methanol was added and stirring continued for about 30 minutes.

The reaction mixture was then diluted with 100 ml. of water. The aqueous phase was separated and was washed with 100 ml. of chloroform and the pH of the aqueous phase was adjusted to a pH of 3.5 with concentrated ammonium hydroxide. The aqueous phase was allowed to stir for 30 minutes during which time 4.38 g. of 7-aminocephalosporanic acid formed as a precipitate. A penicillin assay carried out on the product showed no detectable zone of inhibition.

EXAMPLE 2

When N-chloroacetyl cephalosporin C quinoline salt monohydrate was reacted under the cleavage conditions described in Example 1 with the same quantities and materials employed, except that 7.3 ml. of dimethylformamide were used in place of dimethylacetamide, there was obtained 4.18 g. of 7-aminocephalosporanic acid showing no detectable zone in the penicillin assay described above.

EXAMPLE 3

N-chloroacetylcephalosporin C quinoline salt monohydrate, 13.7 g., was reacted under the cleavage condition described in Example 1 to provide 4.51 g. of 7-ACA showing no detectable zone of inhibition in the penicillin assay.

EXAMPLE 4

Cephalosporin C zinc salt, 11.84 g., afforded 2.21 g. of 7-ACA when reacted under the cleavage conditions as described by Example 1. Penicillin assay on the reaction product gave a trace zone of inhibition indicating that a very minor amount of a penicillin contaminant was present.

EXAMPLE 5

To a solution of 15.3 g. of N-chloroacetyl cephalosporin C quinoline salt monohydrate in 52 ml. of chloroform was added at room temperature the adduct formed by mixing 8.8 ml. of dimethylacetamide with 9.2 ml. of acetyl chloride. The reaction mixture was then cooled to a temperature of about −15° C. and 26 ml. of diethylaniline were added with stirring followed by a solution of 9.8 g. of phosphorus pentachloride in 100 ml. of chloroform. The reaction mixture was thereafter stirred for one hour and 50 ml. of cold methanol were added and stirring continued for an additional hour at −15° C. The cold reaction mixture was diluted with 100 ml. of water and the mixture worked up by the procedure described by Example 1 to yield 4.33 g. of 7-ACA. No detectable zone of inhibition was discernable on the penicillin assay.

I claim:

1. In the process for preparing 7-aminocephalosporanic acid which comprises (1) reacting in an inert solvent a penicillin N contaminated cephalosporin compound of the formula

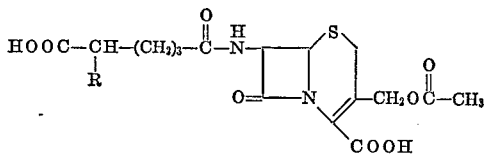

wherein R is an amino group or a protected amino group selected from the group consisting of acetamido, propionamido, butyramido, chloroacetamido, benzamido, phthalimido, and t-butyloxycarbamido, the cationic salts and amine salts thereof formed with an amine selected from the group consisting of quinoline, picoline, lutidine, a di $C_1$–$C_4$ lower alkyl amine, dicyclohexylamine, benzylamine, and dibenzylamine, with a carboxylic acid halide of the formula

wherein
X is chloro or bromo; and
R' is $C_1$–$C_8$ alkyl, $C_2$–$C_6$ alkenyl, $C_2$–$C_6$ alkynyl, $C_1$–$C_8$ haloalkyl, $C_2$–$C_6$ haloalkenyl, phenyl, halophenyl, lower alkylphenyl, or lower alkoxyphenyl;
to provide a compound of the formula

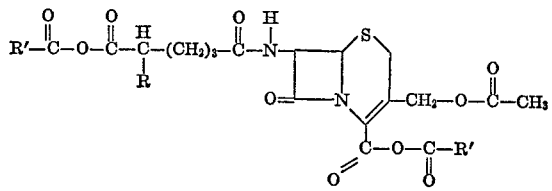

wherein R and R' are as defined above; (2) reacting said compound with a phoshporus chloride to convert said compound to an imino chloride; (3) reacting the imino chloride with a lower alkanol or benzyl alcohol to form an imino ether and (4) hydrolyzing the imino ether to form 7-aminocephalosporanic acid, the improvement which comprises reacting the penicillin N contaminated cephalosporin compound with the carboxylic acid halide in an inert solvent in the presence of between approximately 5 and 20 millimoles of an amide selected from the group consisting of dimethylformamide, dimethylacetamide, pyrrolidone - 2, N - methylpyrrolidone - 2, piperidone-2, and N-methylpiperidone-2 per millimole of said cephalosporin compound.

2. The process of claim 1 wherein the cephalosporin compound is cephalosporin C.

3. The process of claim 1 wherein the cephalosporin compound is N-chloroacetylcephalosporin C quinoline salt.

4. The process of claim 1 wherein the cephalosporin compound is N-propionylcephalosporin C quinoline salt.

5. The process of claim 1 wherein the carboxylic acid halide is acetyl chloride.

6. The process of claim 1 wherein the amide is dimethylacetamide.

References Cited
UNITED STATES PATENTS

| | | | |
|---|---|---|---|
| 3,497,504 | 2/1970 | Wagner | 260—243 C |
| 3,499,909 | 3/1970 | Weissenburger et al. | 260—243 C |
| 3,573,295 | 3/1971 | Johnson et al. | 260—243 C |
| 3,573,296 | 3/1971 | Johnson et al. | 260—243 C |
| 3,575,970 | 4/1971 | Weissenburger et al. | 260—243 C |
| 3,632,578 | 1/1972 | Chauvette | 260—243 C |
| 3,632,810 | 1/1972 | Bickel et al. | 260—243 C |

NICHOLAS S. RIZZO, Primary Examiner